Nov. 30, 1965 F. W. BAILEY 3,220,457
LIQUID-FUEL SMASH ATOMIZING AND BURNING APPARATUS
Filed Sept. 11, 1961 9 Sheets-Sheet 1

INVENTOR.
FRANK W. BAILEY
BY
Curtis, Morris & Safford
ATTORNEYS

Nov. 30, 1965 F. W. BAILEY 3,220,457
LIQUID-FUEL SMASH ATOMIZING AND BURNING APPARATUS
Filed Sept. 11, 1961 9 Sheets-Sheet 2

INVENTOR.
FRANK W. BAILEY
BY
Curtis, Morris & Safford
ATTORNEYS

INVENTOR.
FRANK W. BAILEY
BY
Curtis, Morris & Safford
ATTORNEYS

Nov. 30, 1965 F. W. BAILEY 3,220,457
LIQUID-FUEL SMASH ATOMIZING AND BURNING APPARATUS
Filed Sept. 11, 1961 9 Sheets-Sheet 3
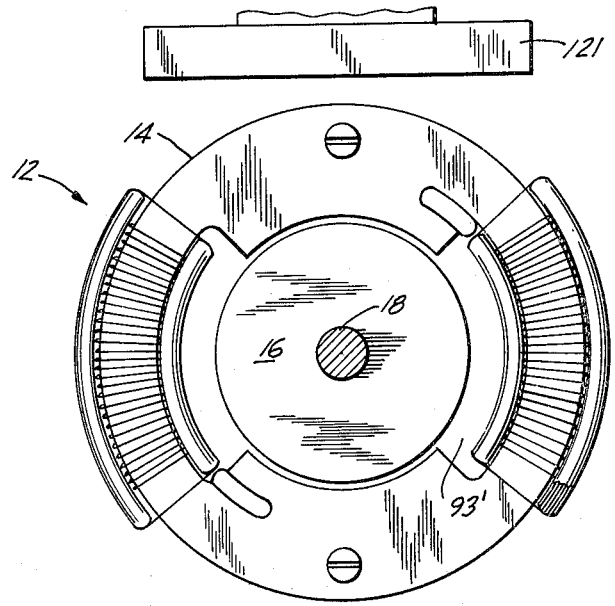
FIG. 3
FIG. 4
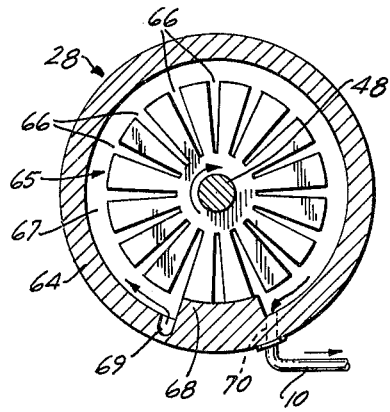
FIG. 4a
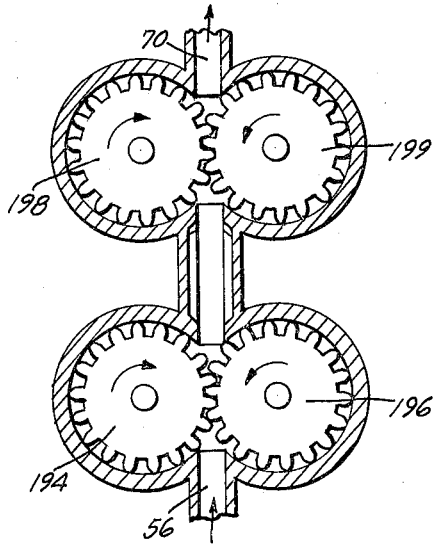
INVENTOR.
FRANK W. BAILEY
BY
Curtis, Morris & Safford
ATTORNEYS Nov. 30, 1965  F. W. BAILEY  3,220,457
LIQUID-FUEL SMASH ATOMIZING AND BURNING APPARATUS
Filed Sept. 11, 1961  9 Sheets-Sheet 4
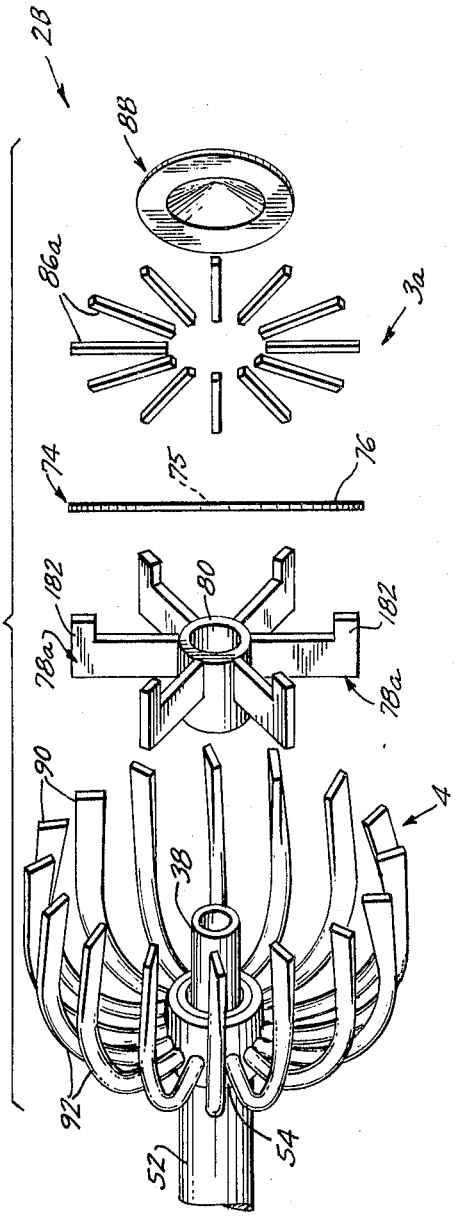
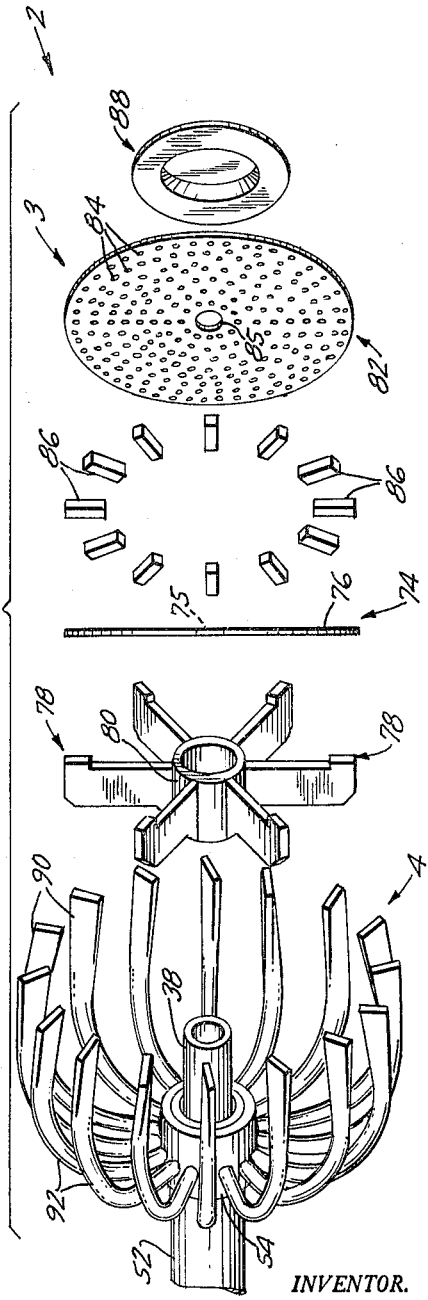
INVENTOR.
FRANK W. BAILEY
BY
Curtis, Morris & Safford
ATTORNEYS Nov. 30, 1965          F. W. BAILEY                3,220,457
       LIQUID-FUEL SMASH ATOMIZING AND BURNING APPARATUS
Filed Sept. 11, 1961                         9 Sheets-Sheet 5

INVENTOR.
FRANK W. BAILEY
BY
Curtis, Morris & Safford
ATTORNEYS

Nov. 30, 1965    F. W. BAILEY    3,220,457
LIQUID-FUEL SMASH ATOMIZING AND BURNING APPARATUS
Filed Sept. 11, 1961    9 Sheets-Sheet 6

INVENTOR.
FRANK W. BAILEY
BY
Curtis, Morris & Safford
ATTORNEYS

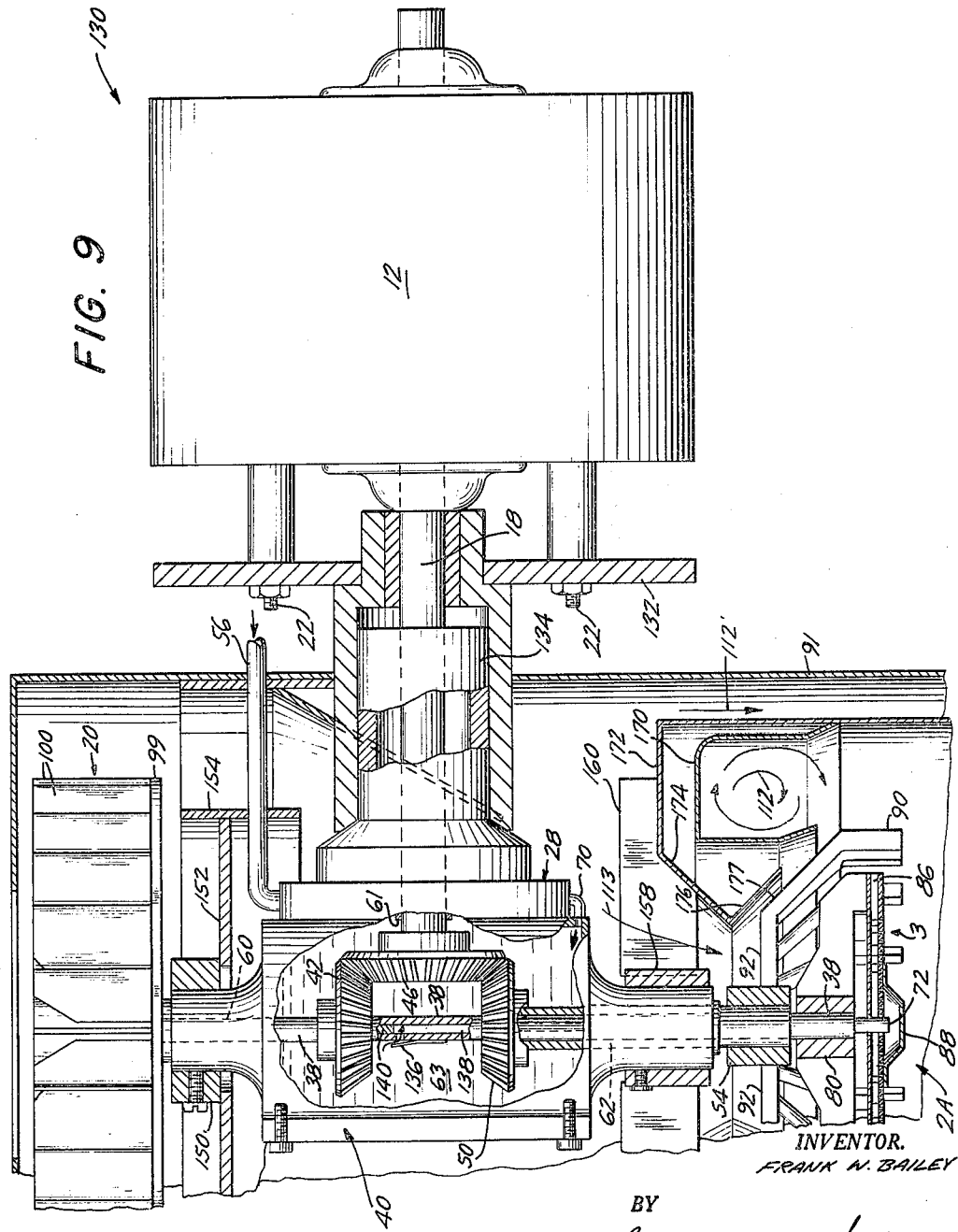

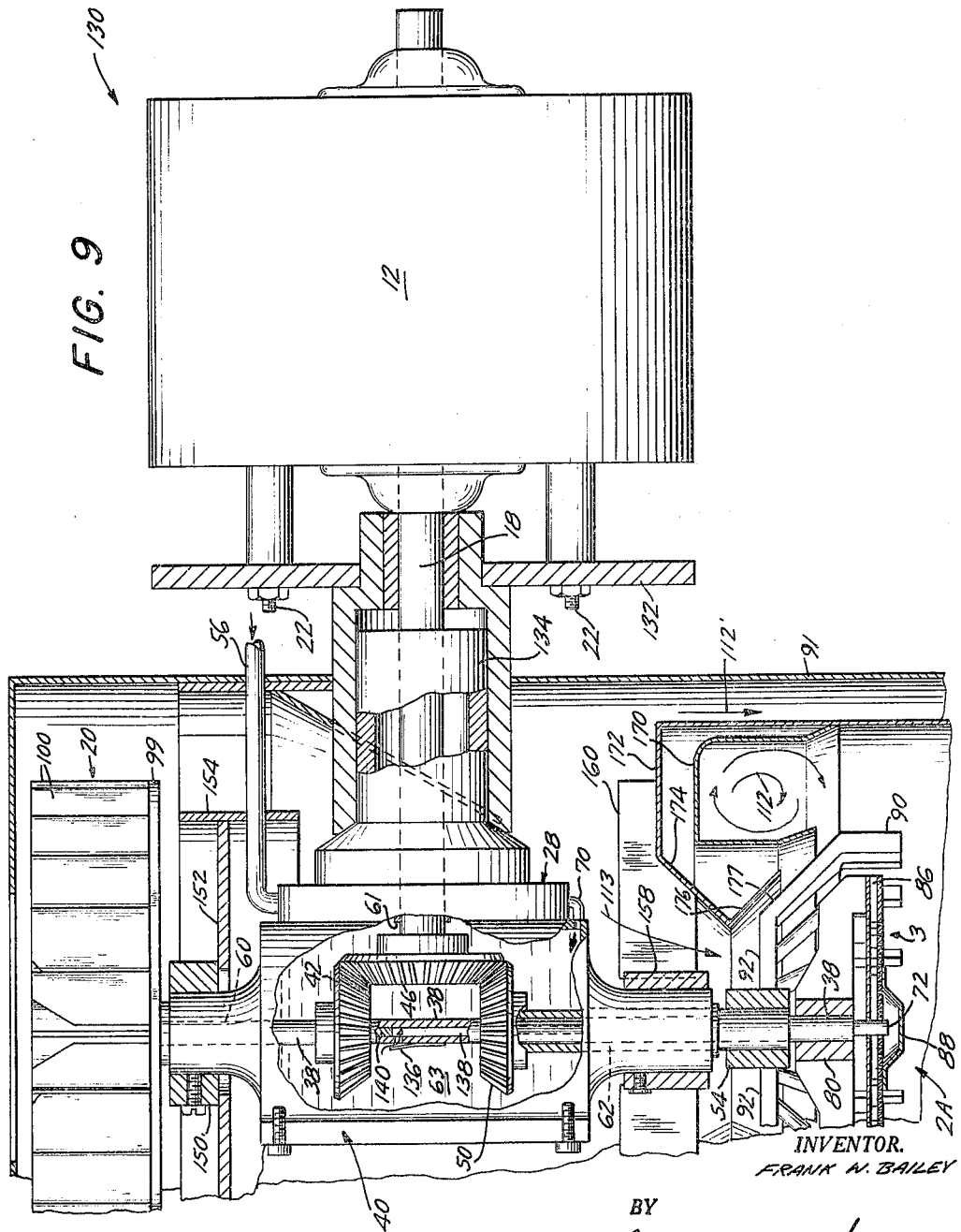

Nov. 30, 1965   F. W. BAILEY   3,220,457
LIQUID-FUEL SMASH ATOMIZING AND BURNING APPARATUS
Filed Sept. 11, 1961   9 Sheets-Sheet 8
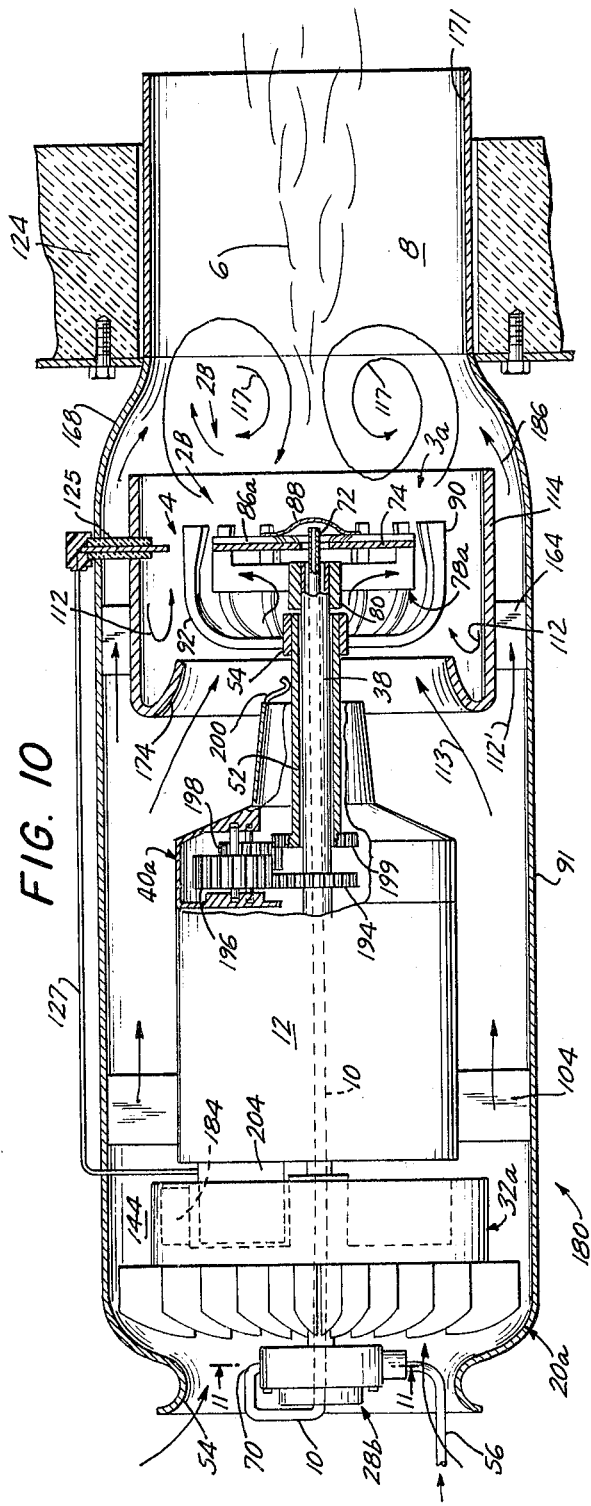
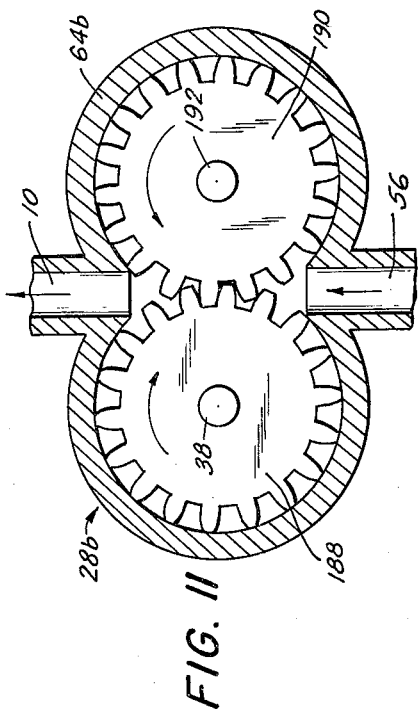
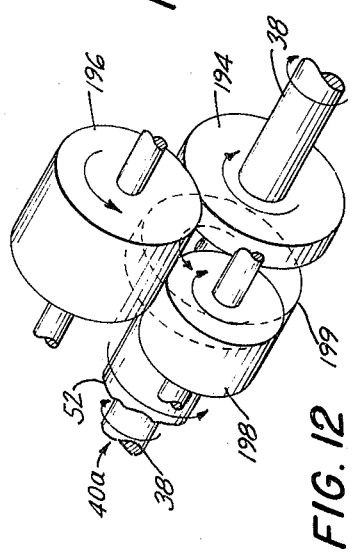
INVENTOR.
FRANK W. BAILEY
BY
Curtis, Morris + Safford
ATTORNEYS

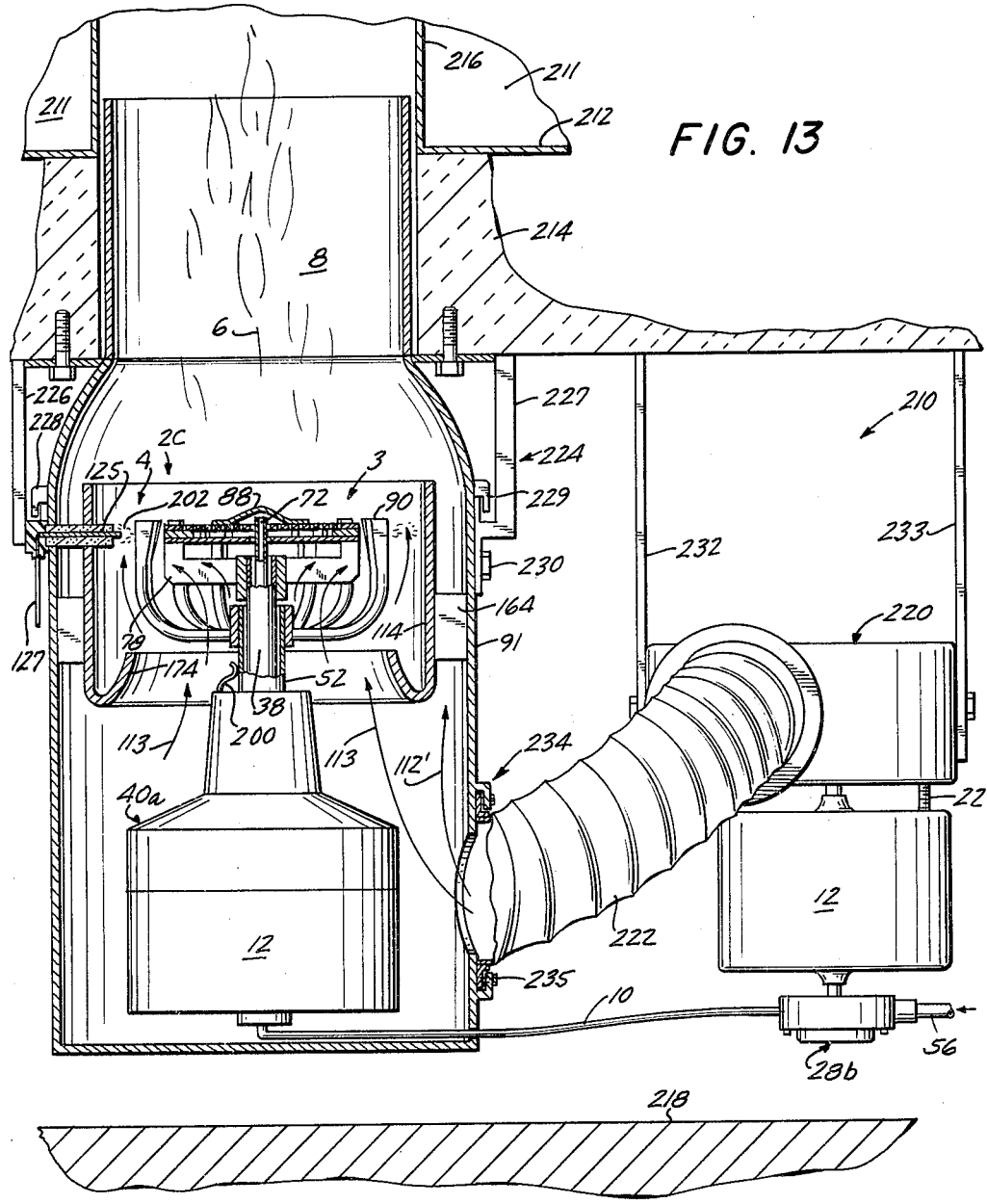

United States Patent Office 3,220,457
Patented Nov. 30, 1965

3,220,457
LIQUID-FUEL SMASH ATOMIZING AND
BURNING APPARATUS
Frank W. Bailey, Wayne, N.J., assignor, by mesne assignments, to Operation Oil Heat Associates, Inc., New York, N.Y., a corporation of Delaware
Filed Sept. 11, 1961, Ser. No. 137,099
13 Claims. (Cl. 158—4)

The present invention relates to liquid-fuel smash atomizing and burning processes and to compact, versatile oil burner apparatus for carrying out these processes. More particularly this invention relates to such processes and apparatus wherein the smash atomization operation is performed by high-speed contra-rotating elements in the presence of active combustion and producing intense agitation of the neighboring combustion zone. The compact versatile apparatus of this invention provides a wide range of burner output from each unit, and thus each unit is adapted for use in a wide variety of different installations wherein different sizes and types of "oil burners" are now being used. For example, the liquid fuel smash atomizing and burning processes and apparatus of the present invention are well adapted for domestic and industrial space heating, for use in hot water heaters and in steam generating plants, for heating chemical reactors and material processing equipment of many different kinds, and for combustible gas generation for fuel cell utilization. It is an advantage of this invention that it provides a high volumetric heat release rate in applications where such high release rates are desired without requiring the use of complex and expensive auxiliary apparatus. In this specification the term "oil" is intended to include liquid fuels of all types in the various applications such as the foregoing.

In the processes and apparatus embodying the invention, the liquid fuel or "oil" to be burned is broken up into droplets, and these droplets are smash atomized by contra-rotating elements producing shearing and splatter impact at high speed in the presence of active combustion and under conditions of exposure to the flames in the combustion zone. During this smash atomization individual droplets of oil are created and are repeatedly and rapidly broken up and shattered so as to produce very finely atomized particles which are fed into the combustion zone and in many instances a pre-heating and partial gasification of the fuel occurs before combustion commences.

Advantageously, the atomized and gasified fuel particles are fed into the combustion chamber by a high intensity pattern of multiple vortices accomplishing an intimate and thorough intermixing of the unburned fuel with the burning fuel and with the incoming air. An active, thorough and efficient combustion is stimulated in a small volume of space. As a result, the present invention avoids the generation and deposit of soot or tarry residue and avoids combustion odors such as occur with the use of many prior oil burners.

Among the many advantages of the present invention are those resulting from the fact that it provides a wide range of combustion capabilities for enabling liquid fuel, such as domestic and industrial types of petroleum fuels, to be consumed efficiently and cleanly and with high volumetric heat release rates in compact self-contained apparatus. A burner unit embodying this invention can be arranged to produce a blue-to-colorless type of intensely hot flame, which is desirable for certain applications, or to produce a luminous flame, but regardless of the flame color, these units provide substantially soot-free combustion. The present invention therefore enables the generation of a soot-free combustible gas from oil suitable for fuel-cell utilization.

Another advantage of oil burners embodying the present invention results from the fact that they operate cleanly and efficiently over a wide range of fuel consumption. In these novel oil burners the rate of fuel flow can be adjusted over a range of 10 to 1 or even more while attaining clean and efficient combustion over the entire operating range. This control versatility enables a given size of burner unit to be used in many different types of installations requiring widely differing rates of heat output; whereas prior to this invention several different sizes of burners were required to meet these different conditions. Moreover, the burners of the present invention are compact and low in cost, readily adapted for large-scale mass production.

In many typical oil burners in use today, the oil is consumed with incomplete combustion and certain undesirable reactions and partial distillations occur. A slight but permeating oily odor is often produced, and the resulting smoke contains sooty, gummy products which build up deposits within the flue duct and chimney or flue stack leading from the furnace. These deposits require periodic cleaning and present the continuous hazard of a chimney fire.

This hazard from typical oil burners now in use is widely recognized in the home-building industry, with the result that many building codes make a clear-cut distinction between the requirements for a chimney in a home equipped with an oil burner and in one equipped with a gas burner. For oil burner installations such codes require that the chimney must be able to protect and insulate the home structure against a continuous fire in the chimney, because it is assumed that combustible deposits of sooty gummy products will likely occur from the oil burner. However, in gas burner installations the chimney need not be able to withstand a continuous chimney fire, because gas-fueled furnaces do not characteristically produce such chimney deposits. Consequently, the chimney for a gas burner installation is less expensive to construct. This easier construction coupled with the customary reduced expense of gas furnaces themselves has led many home builders to avoid the use of oil burners in any construction site where gas connections are available, regardless of whether many other considerations would favor the installation of oil burners.

It is an object of the present invention to overcome these shortcomings of typical oil burners as they are used today and to provide oil burner apparatus which is compact and easy to maintain and is also less expensive and more efficient and providing other operating advantages, such as soot-free and odor-free combustion.

In typical prior oil burners there are various techniques which have been used to try to divide the liquid fuel into small droplets so as to facilitate burning. The nozzle type of burner utilizes a high pressure in the liquid fuel being fed to the nozzle orifice. This high pressure requires the use of a large motor, usually involving electrical relays and complicated circuit arrangements to assure proper starting of the motor. Also, the operating parts of a nozzle-type burner are complex and costly and entail a continuing expense of maintenance by specially trained service personnel. These nozzle burners usually cause difficulty when attempts are made to operate them at a consumption rate of less than 0.3 gallon per hour because the size of the metering orifice for the required pressure differential becomes prohibitively small to operate satisfactorily in practice due to the manufacturing difficulties and susceptibility of the orifice to clogging with the small particles of foreign matter normally suspended in fuel oils.

In the prior slinger disc type of burner, there is a limited range of flow rate over which suitable operation occurs. The viscosity of the liquid fuel on the surface of the slinger disc varies with changes in temperature, and this makes the temperature of the oil and disc critical factors limiting the range of operation for the break-up of the fuel as it is slung from the disc.

The present invention provides a compact burner unit which can be driven by a small low-power inexpensive motor, such as a shaded-pole electric motor. These novel oil burner units can be installed in the same type of furnace and with the same type of flue duct and chimney as used by a gas burner. These compact burner units operate over long periods of time without requiring periodic cleaning and servicing. In the event that service is needed, these compact units are adapted to be conveniently removed and replaced with a new unit in a few minutes. Thus, extensively trained service personnel are not required in the field.

In this specification and in the accompanying drawings are described and shown liquid fuel smash atomizing and burning processes and versatile oil burner apparatus embodying the invention and various modifications thereof are indicated, but it is to be understood that these are set forth for purposes of illustration in order that others skilled in the art may fully understand the invention and the manner of applying the combustion processes and apparatus in practical use so that they may modify and adapt the invention in various forms, each as may be best suited to the conditions of a particular installation.

The various features, aspects, and advantages of the present invention will be more fully understood from a consideration of the following description of embodiments of the invention, considered in conjunction with the accompanying drawings, in which:

FIGURE 3 is an enlarged view illustrating the low-power shaded-pole electric motor for driving the oil burner unit of FIGURES 1 and 2;

FIGURE 4 is a sectional view through the oil pump, being taken along the line 4—4 of FIGURE 1 and shown on enlarged scale;

FIGURE 4A shows a modified pump;

FIGURE 5 is an exploded perspective view of the contra-rotating smash atomizing elements in the burner head and which are exposed to the flame, in the combustion chamber and produce a high intensity swirling agitation of the gases in the combustion chamber;

FIGURE 6 is an exploded perspective view of a modified form of the contra-rotating smash atomizing elements of FIGURE 5;

FIGURE 9 is an axial sectional view taken generally along the line 9—9 in FIGURE 8;

FIGURE 10 is an axial sectional view of another form of oil burner unit embodying the present invention and illustrated as being installed in a domestic heating furnace;

FIGURE 11 is a sectional view through the fuel pump, being taken along the line 11—11 in FIGURE 10 and shown on enlarged scale;

FIGURE 12 is a perspective view illustrated on enlarged scale, and showing the gear mechanism for producing contra-rotation of the smash atomizing elements; and FIGURE 13 is an elevational and partial section view of a further form of oil burner embodying the present invention and illustrated as being installed in a domestic hot water heater.

Figure 1:
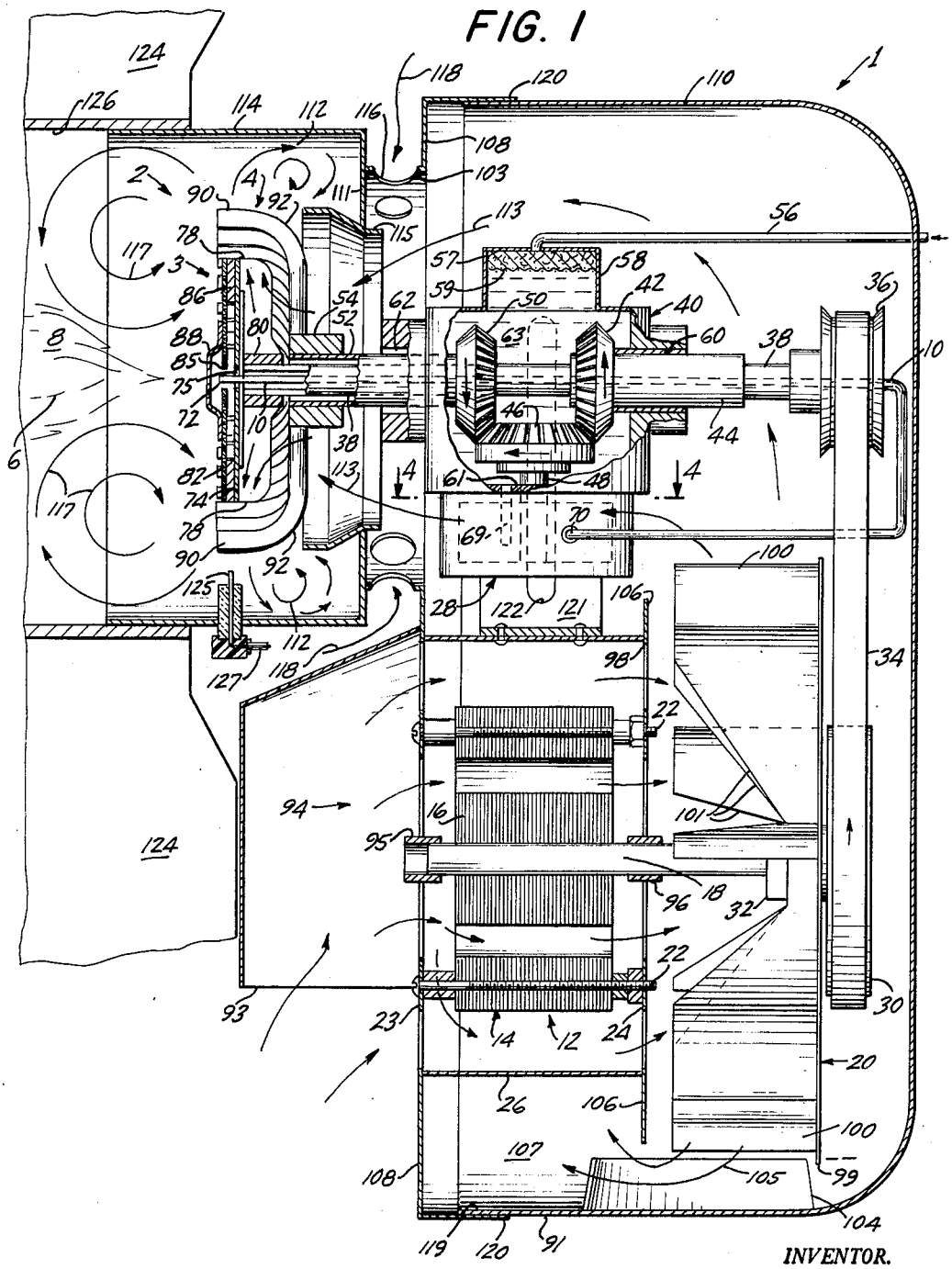
FIGURE 1 is a side elevational sectional view of an oil burner unit embodying the present invention and illustrated as being installed in a domestic heating furnace.
Figure 2:
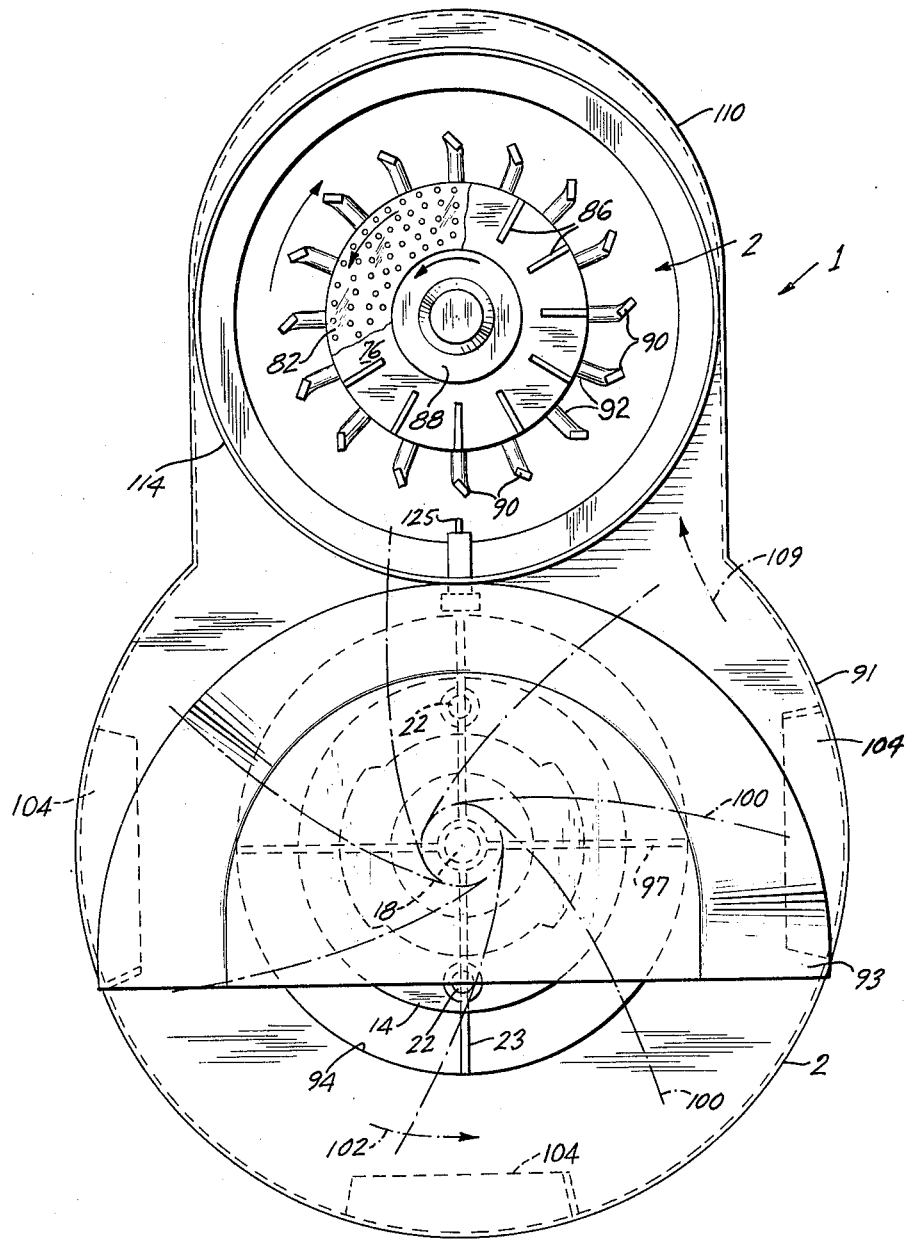
FIGURE 2 is a front elevational view of the novel oil burner unit of FIGURE 1 as seen looking from the left in FIGURE 1.
Figure 2:
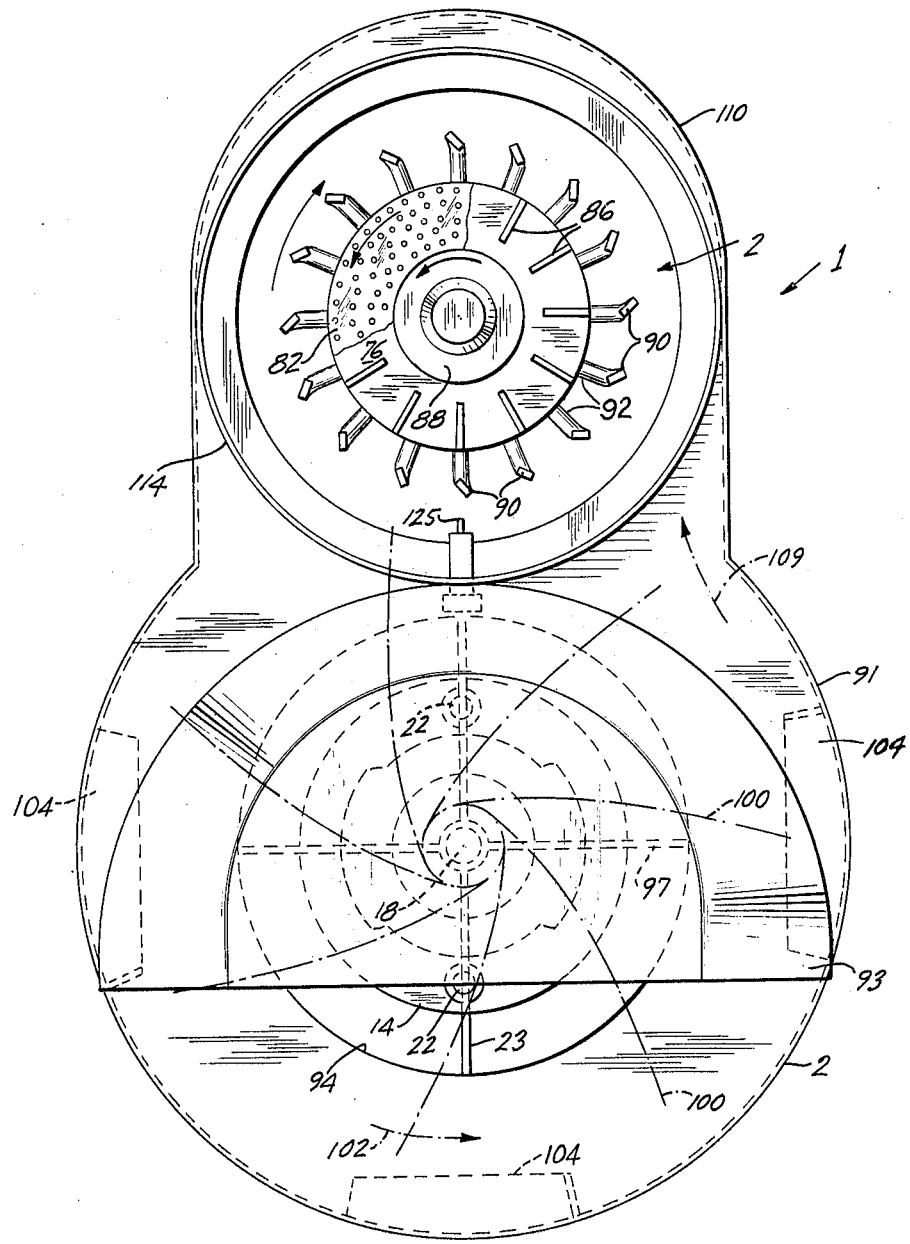

In the oil burner 1 shown in FIGURES 1 and 2, the liquid fuel to be burned is smash atomized by an atomizer head 2 comprising a pair of inner and outer contra-rotating members 3 and 4. The atomizer head 2 is exposed to the flame 6 in the combustion chamber 8 and creates a high intensity of swirling agitation and intimate intermixing of the flaming gases, air and fuel, as will be explained in greater detail further below. The oil is supplied to the atomizer head through a stationary axial feed tube 10. Primary air is induced to flow through the atomizer elements of the contra-rotating members 3 and 4 in a radially outward direction due to the aerodynamic pumping action of the atomizer elements providing a self-cooling of these elements which are otherwise immersed in the combustion gases.

It is an advantage of this oil burner 1 that all of the moving parts can be driven by a small low-power electric motor 12 which is shown in this particular embodiment as mounted generally below the axis of the atomizer head. As an example, this motor is illustrated as being a rugged low-cost motor of the shaded-pole type including a laminated stator 14 and a rotor 16 secured to an elongated drive shaft 18 which also serves as the shaft for a centrifugal blower 20. The stator is mounted by a pair of non-magnetic bolts 22 passing through the laminations and extending between mountings held by a pair of vertical braces 23 and 24 at the front and rear of a housing 26 surrounding the motor.

For driving the atomizer head 2 and also for driving a fuel pump 28, there is a pulley 30 integral with the hub 32 of the blower 20 and positioned behind the blower at the rear end of the drive shaft 18. A rubber belt 34 passes around this pulley 30 and runs up to a smaller pulley 36 secured to the rear end of a rotatable shaft 38. This shaft 38 is hollow so as to accommodate the axial oil feed tube 10 which is seen to enter the rear end of the shaft 38 along the axis of the pulley 36. The hollow shaft 38 extends forward through a gear housing 40 and is connected at its front end to the inner contra-rotating member 3 of the atomizer head. The gear mechanism within the housing 40 serves to drive the outer member 4 in the opposite direction from the inner member 3.

This gear mechanism comprises a rear bevel gear 42 connected by an elongated hub 44 to the shaft 38. An intermediate bevel gear 46 engages the gear 42 and drives a stub shaft 48 for operating the fuel pump 28. This intermediate gear also engages a front bevel gear 50 fixed to a sleeve shaft 52 which is concentric with the rotating shaft 38, and the sleeve shaft 52 is free to rotate about the shaft 38. The two gears 50 and 42 have the same effective pitch diameter, and so they turn at the same speed but in opposite directions with respect to the housing 40. Attached to the front end of the sleeve shaft 52 is a hub 54 of the outer smash atomizer member 4.

In order to provide a positive driving relationship between the pulleys 30 and 36, the inner surfaces of the belt 34 is formed with tooth-like notches such as are used in timing belts, and these two pulleys have gear teeth engaging with the teeth in the belt 34. In this example of the invention, the motor 12 rotates at a speed of approximately 3,2000 revolutions per minutes, and the size ratio of the pulleys 30 and 36 is 36 teeth to 14 teeth, thus turning the shaft 38 at a speed of about 8,200 r.p.m. This timing belt drive system is preferred as compared with a V-belt friction drive system because of the relatively small drive friction and belt tension requirements of the timing belt drive. A small low-power shaded-pole motor as shown has a low starting torque, and so the reduced belt tension is desirable for reducing side thrust on the bearings, also extending the operating life of the bearing.

During operation, the oil is supplied through a fuel line 56 feeding into a strainer compartment 58 forming a top portion of the gear housing 40. Within this strainer compartment is a filter for removing grit and dirt comprising a layer of gauze-like filter material 57 supported on a screen 59, and the oil passes down through this filter into a reservoir 63 within the gear housing 40. The oil serves to lubricate the miter gears 42, 46 and 50 and also to lubricate the sleeve bearings 60, 61 and 62 in which are respectively journaled the elongated hub 44, the stub shaft 48, and the sleeve shaft 52 with the contra-rotating shaft 38 therein.

As shown in FIGURE 4, in this particular example, the fuel pump 28 includes a cylindrical housing 64 and a cylindrical rotor 65 having a plurality of deep radial slots 66 in its perimeter. There is an annular pumping space 67 within the housing 64 substantially completely surrounding the rotor 65 except for the region of a barrier 68. This barrier 68 extends inwardly and is closely adjacent to the perimeter of the slotted rotor 65 with only a very slight clearance therebetween. There is a vertical oil-intake passage 69 communicating between one end of the annular space 67 and the bottom of the gear housing 40 for admitting oil into the pump. As the slotted rotor 65 turns at a high rate of speed, which in this example is 8,200 r.p.m., its frictional and viscous drag upon the oil in the pumping space 67 draws the oil down through the passage 69 and forces the oil out from the pump through an outlet passage 70 into the feed tube 10.

As mentioned previously, the oil feed tube 10 extends forwardly along the axis of the hollow rotating shaft 38, and the oil to be burned is discharged from the front end of the tube 10 which forms an oil discharge nozzle 72 within the inner smash atomizing member 3.

This inner atomizing member 3 includes a thin sheet metal disc 74 which is imperforate except for a single central opening 75 slightly larger than the oil feed tube 10. The nozzle end of the oil feed tube projects forwardly through this central opening 75 to a position just slightly in front of the planar front surface 76 of the disc 74. In order to support this disc 74 while providing heat isolation from the rotating shaft 38, there are provided three or more generally L-shaped support blades 78 secured to the disc 74 at points uniformly spaced about its perimeter and attached to a hub 80 fastened to the front end of the shaft 38.

As illustrated in FIGURE 5, in this example of the invention the inner atomizer member 3 includes six L-shaped support blades 78 having their shanks extending radially from the hub 80 with their forwardly extending foot portions connected to the disc 74. It will be appreciated that each of these blades 78 provides a substantial length between its point of connection to the disc 74 and its point of connection to the hub 80, and the only available path for the conduction of heat from the disc 74 to the hub 80 extends along the full length of these support blades 78. Thus, the arrangement of these support blades tends to restrict the heat flow from the disc 74 to the hub 80.

Moreover, during operation a large portion of the air for supporting combustion is pumped radially along the shanks of these blades as indicated by the air flow arrows in FIGURE 1. This radial flow of the incoming air passing along the shanks of the support members 78 cools them so as to prevent overheating. The advantageous, over-all flow pattern of the air within the burner unit 1 and the desirable interaction between the contra-rotating members 3 and 4 and the flaming gases 6 in the combustion chamber 8 will be explained in detail further below.

In addition to the disc 74, the support blades 78 and the hub 80, the inner atomizer member 3 is shown as including a thin perforated metal disc 82 which is the same diameter as the disc 74 and is parallel to and spaced just slightly ahead of the disc 74. This forward disc 82 is perforated by numerous small closely spaced holes 84 and includes a central opening 85 for receiving the discharge end 72 of the oil feed tube 10. The forward disc is supported by numerous small radially extending spacer blades 86 which are uniformly spaced in an annular pattern about the axis of the atomizer member 3 and which interconnect the two discs near their perimeters. A centrally positioned flame shield 88 in the form of a small sheet metal cup is attached to the front face of the perforated disc 82, with the convex surface of this flame shield facing towards the flame 6.

It will be appreciated that this flame shield 88 and the perforated disc 82 are directly exposed to the flaming swirling gases 6 and also to radiant energy received from the flames so that they both operate at an elevated temperature corresponding generally to red heat or incipient red heat. The operating temperatures of the contra-rotating atomizer members 3 and 4 is not limited to the range of disc atomizers since an entirely different method of atomization, namely, smash atomization, is provided by this invention.

During operation the fuel pump 28 drives the oil forward from the discharge nozzle 72 in the form of a fine stream which strikes into the concave surface of the hot rotating flame shield 88. The oil rapidly begins to heat up, and centrifugal force spreads it out toward the perimeter of this cupped shield 88. The heated oil is ejected rearwardly from the shield 88 through a circle of the perforations 84 which are aligned with the lip of the concavity. Thus, the heated oil is broken up into a multitude of swirling ligaments within the narrow space between the rotating discs 74 and 82.

As these ligaments of heated oil swirl outwardly between the two rotating discs, they are heated further by contact with the hot disc 82 and also by radiant energy passing directly through the perforations 84. A portion of the oil becomes gasified, and the ligaments of hot oil are sheared and splattered as they are struck by the surfaces of the discs and by the inner ends of the spacer blades 86. More of the oil is gasified as the droplets are slung outwardly along the spacer blades 86 toward the rim of the inner atomizer member 3. Consequently, a substantial portion of the oil is preheated and gasified before it is thrown out beyond the rim of the rapidly rotating inner atomizer member 3.

In order to provide a high velocity shearing and splatter impact action, the outer atomizer element 4 includes numerous striker blade elements 90 which are closely spaced about the perimeter of the inner member 3. These striker blade elements are formed by the flattened forwardly extending ends of a plurality of round spokes 92 mounted on the hub 54. In this example of the invention, the inner atomizer member 3 is shown as having a diameter of 2 inches and the outer atomizer member 4 as having a diameter of 2.80 inches. For purposes of explaining the high relative speed between the contra-rotating striker blade elements 90 and the perimeters of the discs 74 and 82, it is noted that they are each rotating at about 8,200 r.p.m. in opposite directions, or a differential of 16,400 r.p.m. between them. At their average diameter of 2.4 inches, this is a relative speed between the atomizer members 3 and 4 of about 175 feet per second or about 120 miles per hour.

As a result of this high relative velocity between the striker blade elements 90 and the perimeter of the inner atomizer member 3, the gasified oil and fine particles of oil which are flung outwardly with high velocity components of tangential and radial motion by the member 3 are smashed against these striker blade elements 90 with shattering impact. The angular velocity of the inner member 3 advantageously provides a substantially homogeneous distribution of gasified oil and oil particles along the path of the striker elements 90. A very effective shearing and shattering of the fine droplets is obtained so that the oil particles become very finely atomized. Moreover, this smash atomization is being carried out in an annular region surrounding the perimeter of the inner member 3 which is exposed to the flaming gases 6 and to their radiant energy. Consequently, the gasification of the fuel continues at a rapid rate as it is smashed and flung into the combustion chamber 8.

It is important to note that the smash atomizer members 3 and 4 serve a further function in addition to the breakup, gasification and distribution of the fuel. These high-speed contra-rotating members are continuously generating powerful swirls and vortices which are spun off from the outer blade elements 90 into the combustion chamber 8 producing an effective, thorough churning and intermixing of the gases in the combustion chamber. In other words, there is an important interaction between the contra-rotating atomizing members 3 and 4 and the intermixing of the gases which produces an efficient, soot-free, odorless combustion.

There is a still further advantage of the smash atomizing and combustion process of this invention. In order to explain this advantage, it is noted that the viscosity of a gas is proportional to the square root of its absolute temperature, as expressed by the relationship:

(1) $$\text{gas viscosity} \sim T^{1/2}$$

By virtue of the fact that the contra-rotating members 3 and 4 are immersed in the flame zone, the gases within which they are swirling are at a highly elevated temperature and thus are much more viscous than these gases would be at room temperature. This increased viscosity enables the contra-rotating members to produce a greater shearing action on the gases within the combustion chamber 8, providing a greater extent of stirring and churning of the gases in the combustion chamber. Moreover, this increased viscosity enhances the entrainment of the atomized oil particles in with the vortices and swirls being flung from the striker blade elements 90 into the combustion chamber 8. There is an intense recirculation of the flaming gases and entrainment of the flaming gases into the swirls and vortices along with the incoming air and with the atomized fuel so as to produce efficient clean combustion. In summary, the contra-rotating members 3 and 4 are much more effective because they are interacting with hot gases of correspondingly increased viscosity resulting from their elevated temperature. A greater turbulence level and hence a more efficient combustion is maintained within the combustion chamber for a given energy imput than would be obtained by compressing air external to the burner and injecting it into the combustion chamber to generate velocity components.

In addition to these advantages there is a reduction in noise level for any given mass flow because the contra-rotating elements 3 and 4 are operating in the flame zone. The formula for Mach No. can be expressed:

(2) $$\text{Mach No.} = \frac{V}{\sqrt{\gamma q R T}}$$

where V is the velocity of the blade elements 90 with respect to the gas, R is the gas constant and T is its absolute temperature, $\gamma$ is the ratio of specific heat of the gas at constant pressure to its specific heat at constant volume, and q is the conversion factor in English units. Thus, the elevated temperature effectively reduces the Mach No. of the moving elements and consequently provides a lowering of the noise level.

In order to disperse the finely atomized oil most widely into the combustion chamber and to produce the optimum smash atomizing of the oil particles, the front faces of the striker blades 90 are inclined backwardly at an angle in the range from 12° to 40° with respect to a radial line from the hub, as is seen in FIG. 2. That is, the inner edges of these smash atomizer elements 90 lead the outer edges. Consequently, as the oil particles smash against the leading edge and against the front face of each striker blade 90, they are shattered and smashed outwardly and are entrained in the swirls and vortices of flaming gases as well as being intimately mixed with the entering blast of air indicated by the arrows 113 (FIG. 1). A highly efficient and intense combustion ensues.

During operation of the oil burner shown in FIGURES 1 and 2, the air for supporting combustion is drawn into casing 91 through an entrance hood 93 into a large circular intake port 94. In order to support the bearings 95 and 96 for the motor-blower shaft 18, there is a strut 97 extending across the intake port 94 at the front of the motor housing 26 and a similar strut extending across the large circular outlet port 98 at the rear of the motor housing. The blower creates a region of reduced pressure within the burner casing 91 directly behind the motor housing so that the incoming air flows through the intake port 94, passing through and around the stator 14 and then out from the motor housing through the outlet port 98. In this way an effective cooling of the motor 12 is provided. Some of the incoming air is forced to pass directly through the space 93' (FIG. 3) between the rotor 16 and the stator 14, and the remainder of this air is forced to flow over the outside of the stator 14.

As shown in FIGURE 1, the centrifugal blower 20 includes an impeller disc 99 secured to the hub 32 adjacent to the pulley 30 and a plurality of impeller blades fastened to the front surface of the disc 99. In this example there are seven blades 100 with their inner ends arranged tangentially to the hub 32, as seen in FIGURE 2, and their outer ends are curved backwardly with respect to the direction of rotation 102. The leading edges of the inner ends of the blades are cut away at 101 (FIG. 1) around the shaft 18 so as to improve the efficiency of the blower.

It will be appreciated that this centrifugal blower drives the air outwardly toward the rim of the impeller disc 99 and also swirls the air within the burner casing 91. In order to direct this outwardly swirling air up into the throat 103 of the burner, nozzle, there are a plurality of stationary guide vanes 104 surrounding the perimeter of the blower 20. These stationary guide vanes are curved so as to direct the air 105 forwardly past the rim of an external flange 106 on the motor housing 26 into an annular blower discharge space 107 extending around the motor housing. This blower discharge space 107 has a generally rectangular configuration as defined by the motor housing 26, the flange 106, the forward portion of the burner casing 91, and by a front cover 108 of the casing.

As shown in FIGURE 2, the air 109 flows tangentially from the upper end of the discharge space 107 into the bonnet portion 110 of the burner casing 91. This air flow 109 passes up around the gear housing 40 so as to provide cooling for it, and then the air rushes forward as indicated by the arrows 113 through the throat 103. An annular wall baffle 111 and a diverging funnel baffle 115 encircles the sleeve shaft 52 between the front end of the gear housing 40 and the rear of the atomizer head 2 so as to provide heat shielding and flame piloting action. The wall baffle 111 and the baffle 115 define an annular region 112 near the periphery of the atomizer elements 90 wherein an intense recirculation of the heated gases occurs, thus providing a flame piloting zone wherein these recirculated hot gases mix with the incoming air and atomized fuel.

The air flow 113 progresses forwardly around the axis of rotation and goes into the rear of the atomizer head 2. This central air flow 113 surrounds the hub 54 and passes forward between the round spokes 92 and engages the support blades 78.

It is important to note that the spokes 92 are rounded or otherwise streamlined near the hub 52 so as to allow a large portion of the central air column 113 to pass forward through the spaces between the spokes. Only the outer ends of these spokes 92 are flattened to form the striker blades 90. In this way the spokes 92 are prevented from masking the inner atomizer member 3 from the air flow 113. Consequently, a strong flow of cooling air strikes the rear of the inner atomizer member near its hub 80, and this air engages the support blades 78. These rapidly moving blades 78 are so effective that they will cause air impingement to occur against the rear of the atomizer member 3 even without the use of the blower 20. That is, the blades 78 by centrifugal blower action create an area of reduced pressure near the hub 80 inducing air flow toward the rear of the atomizer member 3 and causing air to flow out radially along their length to cool them and thus to isolate the hub 80 from the hot flame shield 88 and hot disc 82, as emphasized before. In this way the shafts 52 and 38 and the gear mechanism are protected from overheating.

As indicated by the turbulent pattern 117, an intense agitation of the burning gases in the combustion chamber is created so as to provide clean, efficient combustion with a high heat release rate in a small volume; this swirling 117 is in the opposite direction from that in the flame pilot zone 112. An ignition electrode 125 is positioned radially in line with the plane in which the fuel is being hurled out and atomized. This coincides with the space between the two oppositely swirling masses of gas in the flame pilot zone 112 and the recirculation 117 in the main combustion zone. Thus, in the vicinity of the electrode 125 the atomized fuel and air are travelling radially outwardly toward the tip of the electrode. In order to ignite the fuel, a high voltage is supplied from an ignition transformer through a lead 127 to this electrode, causing sparks to jump to the rotating atomizer elements 90. When a pair of adjacent electrodes 125 are used, then the spark is arranged to jump therebetween.

For purposes of providing additional cooling and heat isolation, the throat 103 includes a plurality of auxiliary air intake openings 116 through which auxiliary air 118 is drawn into the burner nozzle 114. The throat 103 has a reduced pressure due to venturi effect, and thus a substantial quantity of auxiliary air 118 flows into the burner nozzle 114. Moreover, these openings 116 reduce the amount of metal between the nozzle wall 114 and the casing cover 108 and thus reduce heat conduction.

For ease of servicing, the whole casing 91 can be drawn back away from the cover 108 so as to expose all of the moving parts. The edge 119 of the casing 91 conveniently fits into a lip 120 on the cover. It will be noted that all of the mechanism is mounted on the cover 108, not on the removable casing 91. The motor housing 26 is secured to the cover around the intake port 94, and the gear housing 40 is mounted between a pair of upright brackets 121 attached to the top of the motor housing. A vertical slot 122 in each bracket 121 enables the gear housing 41 to be adjusted into alignment with the axis of the burner nozzle 114 when the burner is assembled.

Moreover, for ease of replacement the whole burner 1 is supported from its nozzle 114. The hood 93 advantageously acts as a mounting seat which rests against the wall 124 of the furnace below the entrance 126 to the combustion chamber 8. By withdrawing the nozzle 114 from the furnace opening 126, the whole burner 1 can be removed and replaced in just a few minutes by relatively unskilled personnel, thus to be taken to a centralized service center for overhauling.

This oil burner 1 is adapted to be used in furnaces of the type which have heretofore been known as gas-type or gas-fired furnaces, and it can also be used in furnaces of the type which have hitherto been oil-fired.

The type of fuel pump 28 as shown in FIGURE 4 utilizes viscosity and fractional drag for pumping the oil and provides advantages in the oil burner 1. Instead of this fuel pump 28, the burner 1 may incorporate a positive displacement type of pump, such as the spur gear pump shown in FIGURE 11. As shown in FIGURE 4A, the gear mechanism used to obtain contra-rotation can be used to advantage as a fuel pump 28A. FIGURE 4A is a schematic illustration of a pump utilizing the four gears of the reversing gear mechanism 40a of FIGURES 10, 12 and 13. This pump is described in detail further below. By utilizing more than two gears in serial pumping relationship, a multiple stage pumping action is provided. However, in most installations the viscous drag type of pump 28 is found to work quite satisfactorily.

Figure 8:
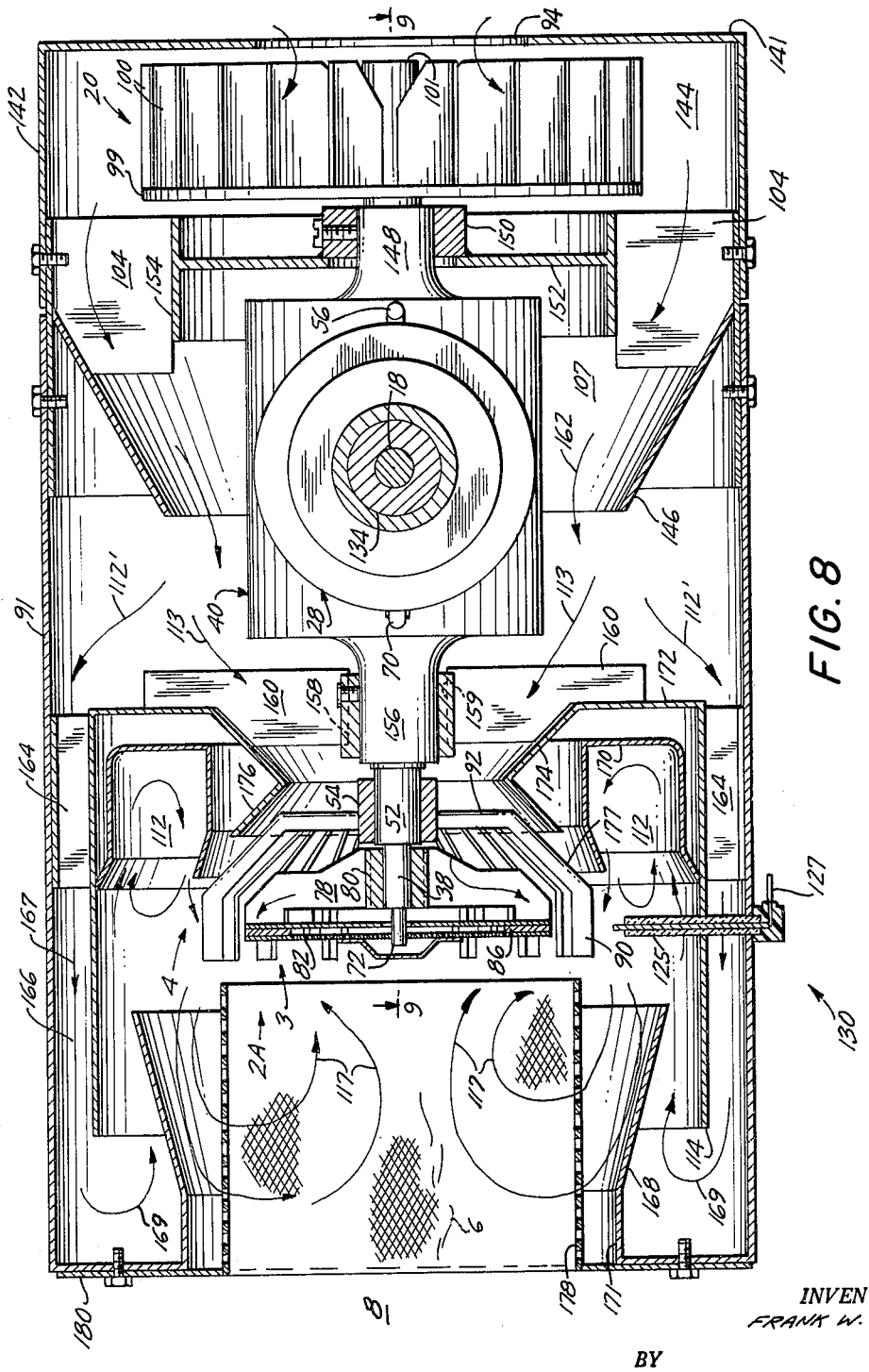
FIGURE 8 is an axial sectional view of another form of oil burner unit shown as a further example of the invention.

In FIGURES 8 and 9 is illustrated a versatile oil burner 130 as a further example of the present invention, and parts thereof performing functions corresponding to those in the oil burner 1 of FIGURES 1 and 2 have corresponding reference numbers. This oil burner 130 has a generally T-shaped configuration as defined by an elongated cylindrical casing 91 with a motor 12 (FIG. 9) projecting off to one side of the center of the casing. Near the combustion chamber 8 at one end of the casing 91 is the smash atomizer head 2A, including inner and outer contra-rotating members 3 and 4. Near the other end of the casing is a blower 20, and a hollow rotatable shaft 38 extends along the axis of the casing between the inner atomizing member 3 and the blower 20.

The motor 12 is mounted on a bracket 132 secured to a bearing mounting 134 of a gear housing 40 within the casing, and the motor shaft 18 extends into the gear housing where it is connected to an intermediate gear 46 of a bevel gear mechanism.

During operation the oil is supplied through a line 56 into an oil pump 28, which is driven by the shaft 18. The oil is discharged from the pump through an outlet passage 70 connected to the interior of the gear housing 40. Thus the oil lubricates the bevel gears 42, 46 and 50, and the respective sleeve bearings 60, 61, and 62 associated with their shafts. This oil within the gear housing forms a reservoir 63 for supplying the oil to a nozzle 72 at the atomizer end of the hollow shaft 38. As the shaft 38 is rotating, centrifugal force holds a resilient flap valve 136 in its open position against its spring force which normally holds it closed when the shaft 38 is stationary. The oil feeds past this flap valve through a lateral passage into an axial passage within the hollow rotatable shaft 38 communicating with the nozzle 72. To prevent the oil from leaking out of the rear end of the shaft 38, its bore 138 is plugged at 140. The flap valve 136 prevents oil from running out of the nozzle 72 during intervals between periods of firing of the burner 130.

In operation the air for supporting combustion is drawn in through an intake port 94 at the center of an end wall 141 of a blower housing 142, which is removably attached to the casing 91. The impeller blades 100 drive the air out into an annular space 144 surrounding the blower, and curved stationary guide vanes 104 arrest the swirling movement of the air and direct the air forwardly into a blower discharge space 107. A converging baffle 146 causes the air flow to concentrate around the gear housing 40 so as to assure adequate cooling of the gear mechanism.

In order to mount the gear housing 40, a bearing support 148 at the back end is removably held in a ring seat 150 which is secured to a partition 152 fastened to a cylindrical wall 154 at the inner ends of the vanes 104. A bearing support 156 at the front end is removably held in a second ring seat 158 which is longitudinally slotted at 159 for removably engaging the inner ends of a plurality of plane radial vanes 160 utilized for smoothing the air flow.

As the air flow 162 leaves the blower discharge space 107 and approaches the vanes 160, it divides into an outer concentric portion 112′ and an inner concentric portion 113. The outer air 112′ blows past a plurality of curved swirling vanes 164 and travels through an annular passage 166 between the casing 90 and the cylindrical wall 114 of the burner nozzle. This air flow 167 through the passage 166 aids in cooling the casing and the burner nozzle wall 114. Around the forward edge of the cylindrical wall 114, the air flow 169 is turned inwardly and directed back by a truncated conical wall 168 which serves to define the burner nozzle in cooperation with the cylindrical wall 114. Thus, the air follows along the inner surface of the wall 114.

Near the back end of the wall 114 is an auxiliary surface 170 of generally U-shaped cross section and of annular configuration which is supported only at its outer front edge. This auxiliary surface is exposed to the heat from the flames 6, and so it operates at elevated temperature because its outer surface is masked from the cooling air flow 112' by an annular partition 172 at the back end of the wall 114. Any condensation or deposition of combustion products on the auxiliary surface 170 is prevented by its elevated operating temperature. By means of the U-surface 170, the air is directed inwardly and then forwardly toward the striker blades 90 around the perimeter of the outer atomizer member 4.

In order to guide the inner portion of the air 113 to flow into and against the back of the atomizer head 2, there is a converging conical baffle 174 secured to the inner edge of the annular partition 172 and adjoined by a shorter diverging conical baffle 176.

The atomizer head 2A shown in FIGURES 8 and 9 is identical with the atomizer head 2 shown in FIGURES 1, 2 and 5, except that the spokes 92 are formed with two angular bends each of approximately 45°. It will be noted that the inner angular bend is at approximately the same radial distance from the burner axis as the minimum radius of the throat of the baffle 174, 176, and the intermediate part 177 of the spoke 92 is parallel to the adjacent surface of the baffle 176. The air blast passes around the hub 54 and engages the support blades 78 which impel the air outwardly as indicated so as to cool these blades. This atomizer head 2A has all of the advantageous operating characteristics of the head 2, and so it will not be described in detail.

When it is desired to provide a blue-to-colorless flame, so-called "flameless" combustion, then a perforated cylinder 178 having a flange 180 is mounted within the burner nozzle 114, 168 by securing its flange 180 to the front end of the casing 91. By operating without the perforated cylinder, then the flame 6 becomes a luminous flame. Regardless of which type of flame is produced, an efficient, soot-free combustion is provided.

It is to be noted that a similar perforated cylindrical surface 178 may be included in the nozzle of the burner of FIGURE 1 if a blue-to-colorless flame, so-called "flameless" combustion, is desired.

In the burner 130 of FIGURES 8 and 9, an advantageous flame pilot zone 112 is created by the U-shaped annular baffle 170 in cooperation with high speed atomizer elements 90. An intense recirculation of the hot gases in this flame pilot zone 112 is induced and maintained. Moreover, there is an intense circulation 117 in the opposite direction within the combustion chamber to provide efficient, clean combustion. An ignition electrode 125 is positioned in the plane between the two oppositely swirling masses of gases 112 and 117, where it encounters the radially outwardly travelling mixture of atomized fuel and air.

In the versatile oil burner 180 shown in FIGURE 10 as a further illustrative example of the present invention, parts performing functions corresponding with those in the oil burners 1 and 130 have corresponding reference numerals. The atomizer head 2B (see also FIGURE 6) is generally similar with the atomizer heads 2 and 2A except that the radial blade elements 86a on the forward face of the disc 74 are longer and extend inwardly sufficiently far to be connected directly with the rim of the cupped shield 88. There is no perforated disc corresponding with the disc 82.

During operation the oil is fed into the region within the cupped shield 88 surrounding the oil discharge nozzle 72. Centrifugal force accelerates the oil outwardly between the blade elements 86a and adjacent to the front face of the disc 74. By virtue of the fact that the oil travelling out between the blade elements 86a is directly exposed to the flame 6, the oil is pre-heated to a substantial extent. This increased pre-heating of the liquid fuel is of advantage in connection with fuels of increased viscosity, e.g. the so-called "heavier" fuel oils.

In order to provide additional thermal isolation between the disc 74 and the hub 80, the forwardly extending foot portions 182 of the L-shaped support blades 78a are shown as being somewhat longer than the corresponding foot portions of the blades 78 in FIGURE 5.

The air is drawn in through a bell-mouthed intake port 54 by a blower 20a which is generally similar to the blowers 20 in the burners 1 and 130. This blower 20a includes an enlarged hub portion 32a which is made of non-magnetic material, such as aluminum or brass, and includes a permanent magnet element 184 forming part of an ignition magneto system which will be described further below. The air is impelled into an annular space 144 surrounding the hub 32a, and a plurality of curved stationary guide vanes 104 arrest the swirling movement of the air and direct it forwardly around the motor 12 which is supported by the vanes 104. The swirling motion of the air is arrested by the vanes 104 so as to assure that a substantial proportion of the air flow moves inwardly along the path 113 toward the axis of the atomizer head 2B for providing adequate cooling thereof. If a rapid swirling is permitted upstream of the converging mouth of the baffle 174, then centrifugal force causes most of the air to take the outer path 112'.

Beyond the forward end of the motor 12, the air flow is divided by a streamlined converging baffle 174 connected to the forward end of the cylindrical burner nozzle wall 114. A swirling motion is then imparted to the outer portion 112' of the air flow at a position which is downstream from the converging mouth of the baffle 174 by means of swirling vanes 164 which support the wall 114. This swirling of the air continues as it rushes into the combustion chamber 8 as indicated by the flow arrow 186.

The inner portion 113 of the air flow passes among the streamlined spokes 92 near the hub 54 and then engages the support blades 78a for cooling them as indicated by the flow arrows adjacent to the blades 78a.

Downstream from the cylindrical wall 114, the casing 91 includes a converging wall portion 168 and a forwardly extending cylindrical wall 171. These wall portions 168 and 171 cooperate with the cylindrical wall 114 to define the burner nozzle and also to define the combustion zone 8 therein. For producing the most violent vortex action in the combustion chamber 8, it is found desirable to arrange the swirl vanes 164 so as to swirl the air flow 186 in the same direction as the direction of rotation as the atomizer elements 90 of the outer atomizer member 4. The atomizer head 2B of the burner 180 is shown in exploded perspective in FIGURE 6.

In order to drive the blower 20a and also to pump the oil forward through the axial feed tube 10, the hollow shaft 38 extending from the rear of the motor 12 is secured to the blower and is also secured to a spur gear 188 (see also FIGURE 11) of a fuel pump 28b. This gear 188 meshes with a companion gear 190 on a stub shaft 192 in a housing 64b and forces the oil from the supply line 56 into the feed tube 10 as shown in FIGURE 11.

For purposes of rotating the outer atomizer member 4 in the opposite direction from the inner atomizer member 3a, there is a gear housing 40a integral with the front end of the motor 12. Within this housing is a drive gear 194 secured to the shaft 38 and engaging with a first idler gear 196 which turns a second idler gear 198. An annular gear 199 attached to the hollow shaft 52 is driven by the second idler gear in the opposite direction from the shaft 38.

To ignite the atomized fuel 202, there is an ignition system including an insulated electrode 125 aligned with the plane of the front surface of the disc 74. This elec-

13 trode is energized with a high voltage so that an electric spark can arc across the space between the exposed tip of the electrode and the striker blades 90. An insulated conductor 127 connects this electrode with a high potential winding of a magneto 204. As the enlarged blower hub 32a rotates, the permanent magnet 184 is revolved past the magneto 204 and induces a high voltage into the conductor 127.

There is an intense recirculation 112 within the region defined by the converging baffle 174 and the wall 114, thus providing a flame pilot zone. An intense circulation 117 in the opposite direction from 112 is induced in the combustion zone, advantageously providing clean, efficient combustion with a high rate of heat release per unit volume of space.

In order to provide a ground circuit, i.e. a return circuit from the atomizer element 4 back to the magneto 204, there is a resilient wiper contact 200 which slidingly engages the shaft 52. This wiper contact 200 is connected to the housing of the motor 12 which serves as the grounded return conductor. Similar wiper contacts are used in the burner 1 and in the burner 130; however, when two electrodes 125 are used and arranged so that the ignition spark jumps between them, then there is no requirement for a return circuit from the outer atomizer member 4.

The reversing gear mechanism within the housing 40a is adapted to be utilized as a fuel pump, as indicated in FIGURE 4A, and can thus be used in lieu of the pump 28b. As shown in detail in FIGURE 12, this reversing mechanism includes four gears 194, 196, 198 and 199. As shown in FIGURE 4a there four gears may be utilized as a two-stage pump. The gears 194 and 196 are meshing and form one stage of the pump. The other gears 198 and 199 are meshing and form the second stage. FIGURE 4a illustrates the operation of this pump as a schematic illustration, but the physical location of the four gears is shown in FIGURES 10 and 12.

In FIGURE 13, the oil burner 210 is arranged to heat water 211 in a hot water tank 212, for example, such as a domestic hot water tank, having a layer of insulation 214 around the tank 212. The hot soot-free combustion gases are sent up through a central duct 216 which extends up through the tank along the axis of the tank for heating the water. This oil burner 210 is identical with the burner 180 of FIGURE 10, except that it is constructed with a shorter axial length and has a separate blower so as to fit vertically within the reduced clearance between the bottom of the tank insulation layer 214 and the floor 218 on which are standing the legs (not shown) of the hot water tank.

In order to reduce the burner length, a separate centrifugal blower in a casing 220 is positioned off to one side of the burner casing 91, and the air is supplied through a flexible duct 222. A small motor 12, such as a shaded-pole motor, drives the blower 220 and also drives a spur-gear fuel pump 28b, such as the pump shown in FIGURE 11. This blower 220 includes a magneto system for energizing the ignition conductor 127, which is connected to this magneto system, as will be understood. A second similar small motor 12 within the casing 91 serves to drive the contra-rotating atomizer members 3 and 4 of the atomizer head 2C.

This atomizer head 2C is identical with the atomizer head 2 of FIGURE 5, except that the support blades 78 of the inner atomizer member 3 have a slightly different shape.

For purposes of facilitating replacement of the whole burner 210 in the event that it should require servicing, a quick-disconnect type of mounting 224 is provided. This mounting 224 includes a pair of brackets 226 and 227 which are engaged by hooks 228 and 229, respectively. To remove the burner, it is twisted so as to disengage these hooks from the brackets. During operation a locking screw 230 prevents the casing 91 from twisting.

14

The blower 220 and its motor 12 are removably suspended from a pair of brackets 232 and 233. When it is desired to remove the casing 91 but to leave the blower installed, then the flexible duct 222 is disengaged from the casing 91 by means of a quick-disconnect coupling 234 which is twisted for disengagement. A locking screw 235 normally prevents disengagement.

Figure 7:
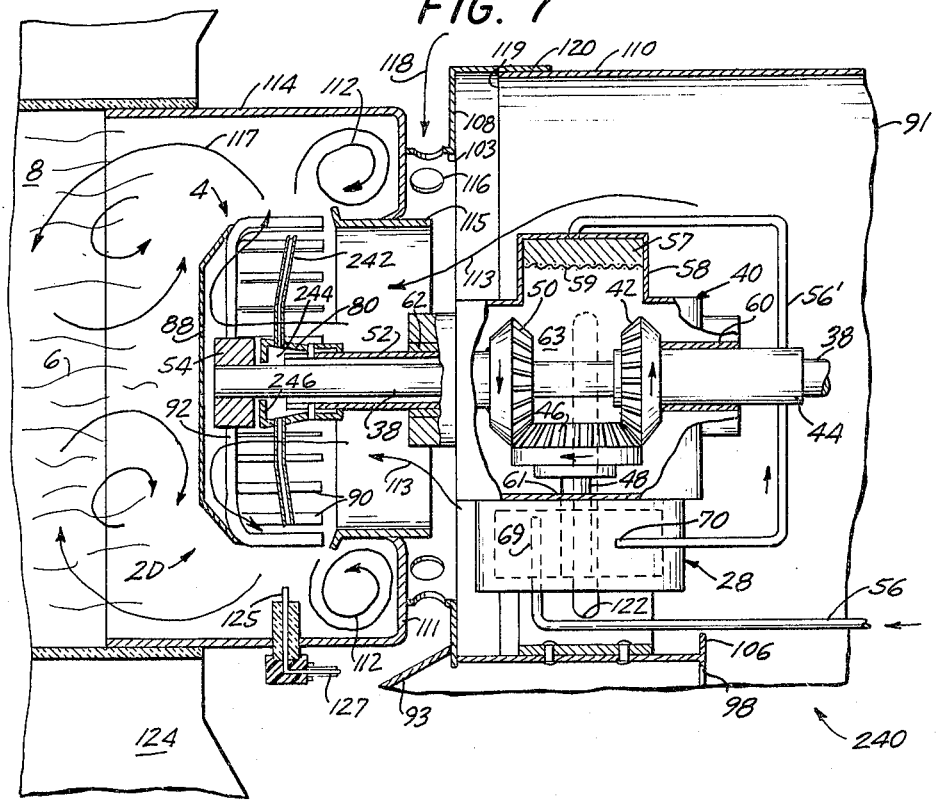
FIGURE 7 is an axial sectional view of a further modified atomizer head.
Figure 7A:
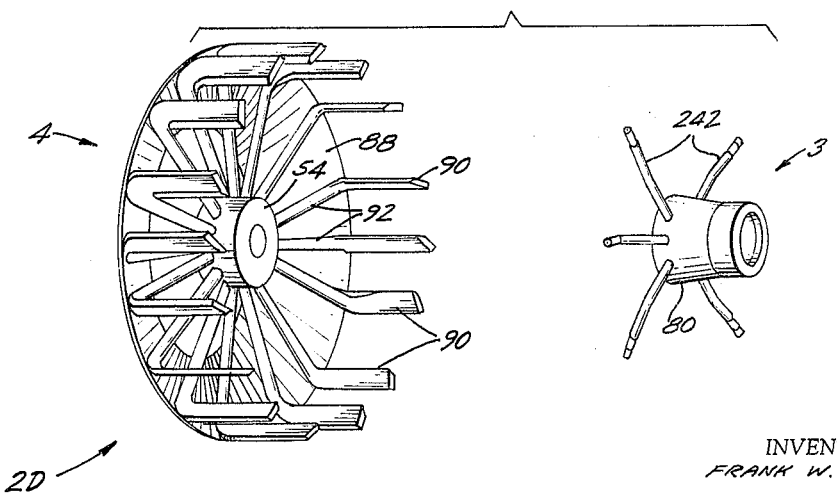
FIGURE 7A is an exploded perspective view of the atomizer head of FIGURE 7.

In FIGURES 7 and 7A is illustrated a burner 240 which is generally similar to the burner 1 of FIGURES 1, 2 and 5, except for the differences described below. Parts performing functions corresponding with those of parts in the burner 1 have corresponding reference numbers. The fuel oil is supplied through a line 56 to a fuel pump 28 which then pumps the fuel through the pump outlet 70 and by a line 56' into a reservoir 63 in the gear housing 40, passing through a fuel filter 58.

From the gear housing 40 the fuel is fed forwardly through the annular space surrounding the shaft 38 and within the outer hollow shaft 52, which rotates in the opposite direction from the shaft 38. At the forward end of the outer shaft 52 is an inner atomizer member 3 comprising a hollow hub 80 and a plurality of spoke-like tubes 242. This hub has an enlarged central chamber 244 therein communicating with the inner ends of all of the spoke tubes 242. As the fuel oil reaches the front end of the shaft 52, it is collected within the chamber 244 and is flung outwardly through the tubes 242. An internal flange 246 forms a barrier at the front of the hub 80 so that centrifugal force prevents the oil from leaking out from the front of the chamber 244.

An outer atomizer member 4 includes a hub 54 connected to the inner shaft 38 with a plurality of rod-like atomizer elements 92 radiating therefrom and having blade-like ends 90 which rotate around the ends of the tubes 242. Thus, as the oil is discharged from the tubes 242, it is smash-atomized by impact against the contra-rotating atomizer blade elements 90. The front surfaces of these atomizer blades slope backwardly with respect to the direction of rotation similar to the atomizer head 2 as described in connection with FIGURES 1, 2 and 5. A cupped flame-shield 88 has its periphery attached to the atomizer elements 92 near their blade ends.

During operation the air flow 113 travels forwardly around the shaft 52 and passes among the tubes 242 and among the streamlined atomizer elements 92 so that this incoming air impinges against and washes over the rear surface of the flame shield 88 so as to cool it. Thus, the hubs 54 and 80 are protected from overheating. An intense pilot flame zone 112 and turbulent combustion pattern 117 are created so as to provide clean, efficient combustion.

It will be understood that corresponding reference numbers used in the various figures indicates parts performing corresponding functions in the various illustrative embodiments of the invention disclosed herein. In the foregoing specification five different atomizer heads 2, 2A, 2B, 2C, and 2D each including contra-rotating members, are described. Any one of the four atomizer heads 2, 2A, 2B and 2C is adapted to be used in any one of the five burners 1, 130, 180, 210, or 240, when it is arranged to deliver oil through a stationary axial feed tube 10. The fifth atomizer head 2D has its oil supplied through the space between the inner and outer contra-rotating shafts 38 and 52. Thus, this atomizer head is adapted for use in any of these burners when it is arranged to have fuel oil supplied to the space within the reversing gear housing so as to feed the oil into the annular space surrounding the shaft 38 and within the hollow shaft 52.

Advantageously, the oil burners disclosed herein as embodying the present invention are adapted to be driven by compact low-cost shaded-pole motors having a horsepower of $\frac{1}{10}$ or less.

From the foregoing it will be understood that the liquid fuel smash atomizing and burning processes and the versatile oil burner apparatus embodying the present invention as described above are well suited to provide the advantages set forth, and since many possible embodiments may be made of the various features of this invention and as the processes and apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention.

What is claimed is:

1. Apparatus for smash atomizing and burning liquid fuel comprising stationary wall means defining a combustion zone, gas supply means for supplying combustion-supporting gas to said combustion zone, first and second members mounted for rotation about an axis, drive mechanism for rotating said members in opposite directions about said axis, said drive mechanism including an inner rotatable shaft extending to said second member and a hollow outer shaft concentric about said inner shaft, said first member having a hollow annular hub connected to the end of said hollow outer shaft and said first member including a plurality of tubes extending generally radially outward from said hub, liquid fuel supply means for feeding liquid fuel to the space within said outer shaft surrounding said inner shaft for supplying the fuel to said hub for centrifugally accelerating the liquid fuel and for centrifugally flinging the liquid fuel outwardly from said first member, and said second member including a plurality of striker elements spaced completely exterior of and concentric about said first member and positioned in the combustion zone for striking against the liquid fuel flung out by said first member, for breaking up said liquid fuel into finely divided particles and for churning up the particles and combustion-supporting gas in the combustion zone.

2. Apparatus for smash atomizing and burning liquid fuel comprising stationary wall means defining a combustion chamber, a pair of rotatable shafts concentrically mounted on an axis and having their ends projecting into said combustion chamber, drive mechanism for rotating said shafts in opposite directions about said axis, a first hub on the end of one of the said shafts having a plurality of support elements extending outwardly therefrom, a disc positioned in the combustion chamber in front of said hub and having a front surface facing the interior of the combustion chamber spaced from said hub and lying in a plane perpendicular to said axis, forming a flame shield, means connecting the perimeter of said disc to the outer ends of said support elements, a second hub on the end of the other of said shafts having a plurality of oil flinging elements extending outwardly from said second hub in a plane perpendicular to said axis, liquid fuel supply means for feeding liquid fuel to said flinging elements, a plurality of striker blades connected to the perimeter of said disc and projecting into the plane of said flinging elements and spaced radially outwardly beyond the ends of said flinging elements for smashing the fuel thrown outwardly from said flinging elements into finely divided particles, and gas supply means for blowing a combustion-supporting gas parallel to said axis and passing along said shafts and by said second hub and between said flinging elements, said gas engaging said support elements and being impelled outwardly therealong adjacent to the back surface of said disc for cooling said support elements and said disc.

3. Apparatus for smash atomizing and burning liquid fuel comprising stationary wall means defining a combustion chamber, a pair of rotatable shafts concentrically mounted on an axis, drive mechanism for rotating said shafts in opposite directions about said axis, a first hub on one of said shafts having a plurality of support elements extending outwardly therefrom, a disc positioned in the combustion chamber before said hub and having a front surface facing toward the interior of said combustion chamber, said disc being spaced from said hub and lying in a plane perpendicular to said axis for providing a flame shield, means connecting the disc at points near its perimeter to the outer ends of said support elements, a second hub on the other of said shafts having a plurality of tubular fuel-flinging elements extending outwardly from said second hub in a plane perpendicular to said axis, said second hub having an opening therein communicating with said tubular elements, and said other shaft being hollow, liquid fuel supply means for feeding liquid fuel through said hollow shaft and through the opening in said second hub to said tubular elements, a plurality of striker blades connected to the perimeter of said disc and projecting into the plane of said tubular elements and spaced radially outwardly beyond the ends of said tubular elements for breaking up the fuel thrown outwardly therefrom into finely divided particles, and gas supply means for blowing a combustion-supporting gas parallel to said axis and passing by said second hub between said tubular elements, said gas engaging said support elements and being impelled outwardly therealong adjacent to the back surface of said disc for cooling said support elements and said disc.

4. Apparatus for smash atomizing and burning liquid fuel comprising stationary wall means defining a combustion chamber, a pair of rotatable shafts concentrically mounted on an axis and extending into the combustion chamber, drive mechanism for rotating said shafts in opposite directions about said axis, a first hub on one of said shafts having a plurality of support elements extending outwardly therefrom, a disc spaced from said hub and lying in a plane perpendicular to said axis, said disc providing a flame shield and having a front surface facing into the combustion chamber, means connecting said disc to said support elements at points spaced outwardly from said hub, a second hub on the other of said shafts having a plurality of fuel-flinging elements extending outwardly therefrom around said axis, liquid fuel supply means for feeding liquid fuel to said flinging elements, the outer ends of said support elements being positioned radially completely exterior of and concentric about the outer ends of said flinging elements for forming a plurality of striker blades for breaking up the fuel thrown outwardly from said flinging elements into finely divided particles for inducing recirculation in the combustion chamber back along a path aligned with said axis toward said flame shield, and gas supply means for blowing a combustion-supporting gas parallel to said axis and passing said second hub between said centrifuging elements, said gas engaging said support elements and being impelled outwardly therealong adjacent to the back surface of said disc for cooling said support elements and said disc.

5. Apparatus for smash atomizing and burning liquid fuel comprising stationary wall means defining a combustion zone, inner and outer coaxial shafts rotatably mounted and extending toward said combustion zone, drive mechanism for rotating said shafts in opposite directions about their axis, a generally circular flame shield spaced from the end of the inner shaft, said flame shield being near to the combustion zone and lying in a plane perpendicular to said axis and having a front surface facing into the interior of the combustion zone, a plurality of support elements secured to said inner shaft and extending outwardly from said axis, means connecting the perimeter of said flame shield to said support elements at points spaced from said axis, said inner shaft being hollow, liquid fuel supply means for feeding liquid fuel axially through said inner shaft and for discharging the liquid fuel near said flame shield, means carried by said first shaft for centrifugally throwing the fuel outwardly beyond the perimeter of said flame shield, a plurality of elements secured to said outer shaft and extending outwardly from said axis with the outer ends of said elements carrying striker blades extending into the plane of said flame shield and positioned radially outwardly about the perimeter of said flame shield for striking the fuel being thrown out beyond the perimeter of said flame shield for breaking up the fuel into finely divided particles, and gas supply means for blowing a combustion-supporting gas in a direction generally along parallel with said outer shaft toward the combustion zone and passing between said blade-carrying elements toward the back surface of said heat shield, said support elements impelling the gas outwardly therealong for cooling them for providing heat isolation from the inner shaft.

6. Apparatus for smash atomizing and burning liquid fuel comprising stationary wall means defining a combustion zone, inner and outer coaxial shafts rotatably mounted and extending toward said combustion zone, drive mechanism for rotating said shafts in opposite directions about their axis, a generally circular flame shield spaced from the end of the inner shaft, said flame shield being near to the combustion zone and lying in a plane perpendicular to said axis, a plurality of support elements secured to said inner shaft and extending outwardly from said axis, means connecting said flame shield to said support elements at points spaced from said axis including a centrally apertured disc in closely spaced parallel relationship to said flame shield and positioned between said flame shield and the end of said inner shaft and a plurality of fuel impeller elements positioned between said flame shield and said disc, said inner shaft being hollow, liquid fuel supply means for feeding liquid fuel axially through said inner shaft and for discharging the liquid fuel through the aperture in said disc to the region between said disc and said flame shield, said fuel impeller elements throwing the fuel outwardly beyond the perimeter of said disc, a plurality of radially extending circumferentially spaced elements attached to said outer shaft carrying striker blade elements extending through the plane of said disc and positioned radially outwardly about the perimeter of said disc for striking the fuel being thrown out for breaking up the fuel into finely divided particles, and gas supply means for blowing a combustion-supporting gas in a direction generally along parallel with said axis toward the combustion zone and passing between said circumferentially spaced elements toward said disc, said support elements impelling the gas outwardly therealong for cooling them, thereby to isolate said inner shaft from the heat.

7. Apparatus as claimed in claim 6 and including a perforated disc secured to said flame shield and to said fuel impeller elements.

8. A compact oil burner comprising stationary wall means defining a combustion zone, a first rotatable member in said combustion zone, a second rotatable member in said combustion zone adjacent to and coaxial with said first member and including a plurality of striker elements adjacent to and completely exterior of said first member, drive means for rotating said members including a reversing gear mechanism connected to said two members for rotating them in opposite directions, said reversing gear mechanism including a housing with gears therein, and liquid fuel supply means connected to the interior of said housing and connected from said housing to said first member for supplying liquid fuel through said housing to said first member.

9. A compact oil burner comprising stationary wall means defining a combustion zone, a first rotatable member in said combustion zone, a second rotatable member in said combustion zone adjacent to and coaxial with said first member and including a plurality of striker elements adjacent to and completely exterior of said first member, drive means for rotating said members including a reversing mechanism having a housing with gears therein connected to said two members for rotating them in opposite directions, said reversing mechanism requiring cooling and lubrication, liquid fuel supply means connected into the housing of said reversing mechanism for supplying liquid fuel to said reversing mechanism for cooling and lubrication thereof, and means for feeding said liquid fuel from the housing of said reversing mechanism to said first member.

10. A compact oil burner as claimed in claim 9 and wherein said first member has a hollow rotatable drive shaft extending from the housing of said reversing mechanism, the liquid fuel being fed through said hollow shaft.

11. A compact oil burner comprising stationary wall means defining a combustion chamber, a first rotatable member in said combustion chamber having a rotatable drive shaft connected thereto, a second rotatable member in said combustion chamber adjacent to and coaxial with said first member and including a plurality of striker elements adjacent to and completely exterior of said first member, said second member having a hollow rotatable drive shaft connected thereto and concentric with said first shaft, drive means for rotating said members including a reversing mechanism connected to said two shafts for rotating them in opposite directions, liquid fuel supply means for supplying liquid fuel through said reversing mechanism and through the space within said hollow shaft for feeding liquid fuel to said second members.

12. A compact oil burner as claimed in claim 11 and wherein said second member includes a plurality of outwardly extending tubes communicating with the space within said hollow shaft.

13. A compact oil burner for providing a high volumetric heat release rate comprising stationary wall means surrounding a combustion chamber adapted to have flames therein, a pair of coaxial shafts extending into said combustion chamber, a first and a second rotatable member positioned in said combustion chamber and secured to respective ones of said shafts for coaxial rotation of said members, said members being in a position to be immersed in the flames in said combustion chamber, gas supply means for supplying a combustion-supporting gas to said chamber, oil supply means for feeding oil to said first member, said first member including a plurality radially extending circumferentially spaced elements for flinging the oil outwardly, said second member including a plurality striker blades circumferentially spaced about said first member in a position to be immersed to the flames in said combustion chamber and in a position to smash the oil particles flung out by said first member, and drive means secured to said shafts for rotating said members at high speed in opposite directions with said striker blades moving at high velocity relative to the periphery of said first member for intensely churning the flames in the combustion chamber.

References Cited by the Examiner

UNITED STATES PATENTS

| | | | |
|---|---|---|---|
| 548,647 | 10/1895 | Mack | 158—77 |
| 1,539,111 | 5/1925 | French et al. | 158—77 X |
| 1,613,539 | 1/1927 | Sheehy | 158—77 |
| 1,693,053 | 11/1928 | Rodler | 158—77 |
| 1,695,030 | 12/1928 | Scheminger | 158—4 |
| 1,856,720 | 5/1932 | Meikle | 158—4 |
| 1,935,318 | 11/1933 | Hawxhurst | 158—77 |
| 1,949,260 | 2/1934 | Schenck et al. | 158—4 |
| 1,977,336 | 10/1934 | Gorretta | 158—42.1 |
| 2,239,068 | 4/1941 | Wood | 158—77 |
| 2,263,861 | 11/1941 | Stolper et al. | 158—77 |
| 2,473,035 | 7/1949 | Meade et al. | 239—224 |
| 2,665,892 | 1/1954 | Rumpler | 239—223 |
| 2,929,442 | 3/1960 | Brola | 158—77 |

JAMES W. WESTHAVER, *Primary Examiner.*

FREDERICK L. MATTESON, JR., MEYER PERLIN,
*Examiners.*